W. V. TURNER.
FLUID PRESSURE BRAKE.
APPLICATION FILED MAR. 8, 1915.

1,255,955.

Patented Feb. 12, 1918.
3 SHEETS—SHEET 1.

WITNESSES
H. W. Crowell
C. M. Clements

INVENTOR
Walter V. Turner
by Wm. M. Cady
Att'y.

W. V. TURNER.
FLUID PRESSURE BRAKE.
APPLICATION FILED MAR. 8, 1915.
1,255,955.
Patented Feb. 12, 1918.
3 SHEETS—SHEET 2.
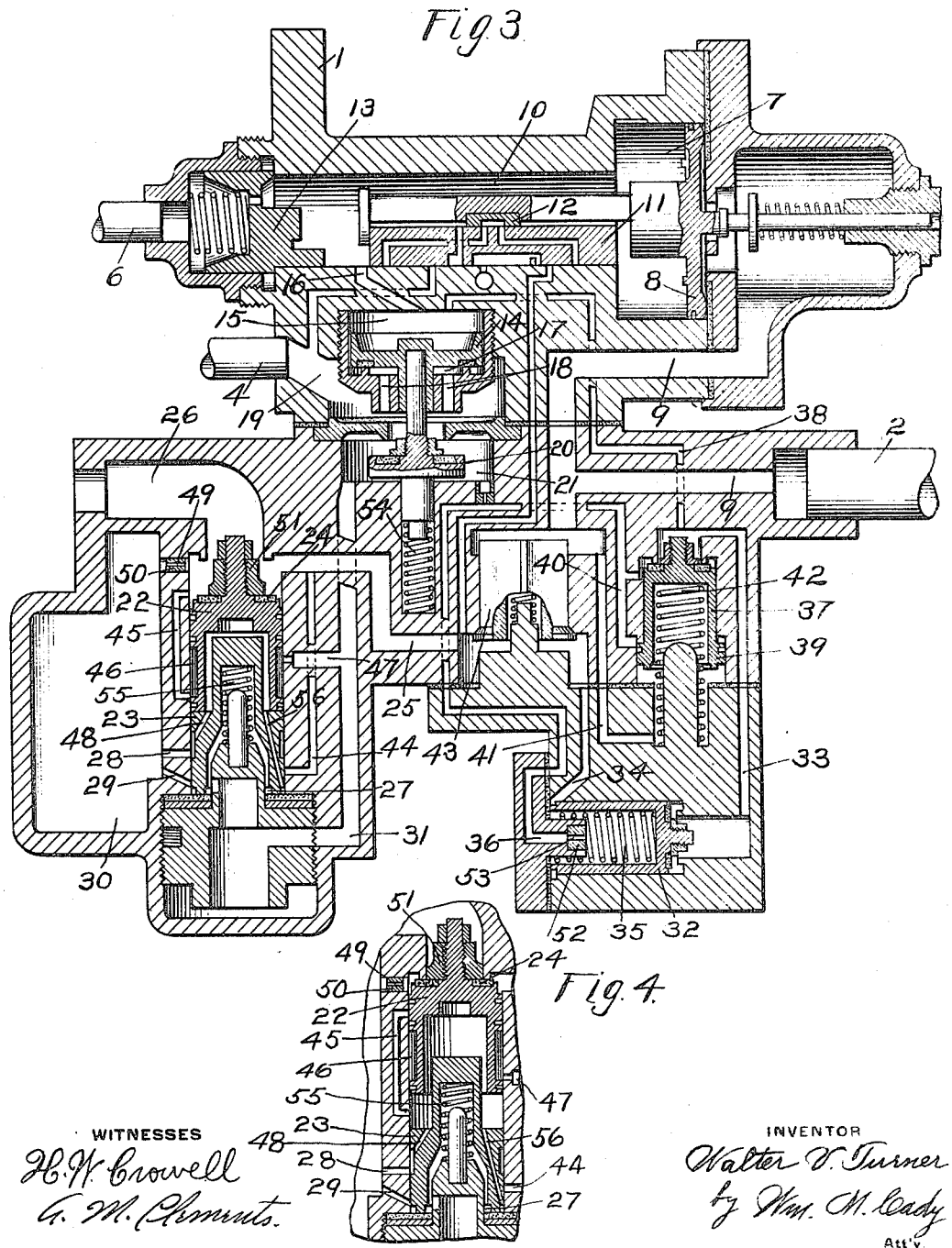

W. V. TURNER.
FLUID PRESSURE BRAKE.
APPLICATION FILED MAR. 8, 1915.

1,255,955.

Patented Feb. 12, 1918.
3 SHEETS—SHEET 3.

WITNESSES

INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,255,955.      Specification of Letters Patent.      Patented Feb. 12, 1918.

Application filed March 8, 1915. Serial No. 12,778.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake equipment adapted for the handling of long trains and high capacity cars, such as are employed in freight service.

Modern freight trains of a given number of cars are longer than was formerly the case, owing to the greater capacity and length of the cars, and also the possible number of cars in a train has increased from a former maximum of say fifty cars, to one hundred or more cars.

While the ordinary well known quick serial action feature was satisfactory for the former service and even for the increasing demands of more modern service up to a certain extent, with the present capacity of cars and lengths of trains, the rapidity with which full braking pressure is obtained at the head end of the train is such that in some cases before quick serial action can be transmitted to the rear of a long train to apply the brakes at the rear, the unbraked cars at the rear will have time to run into the braked cars at the head end and thus cause damaging shocks and possible buckling of the train.

The principal object of my invention is to obviate the above difficulty and for this purpose means are provided for delaying the building up of braking pressure in an emergency application of the brakes on the cars at the head end of the train until braking pressure has been obtained on the rear cars and by this and other means a more nearly simultaneous building up of braking pressure on all the cars of the train is thus secured, so as to prevent the slack of the train from running in and thereby tending to cause damaging shocks.

Figure 2:
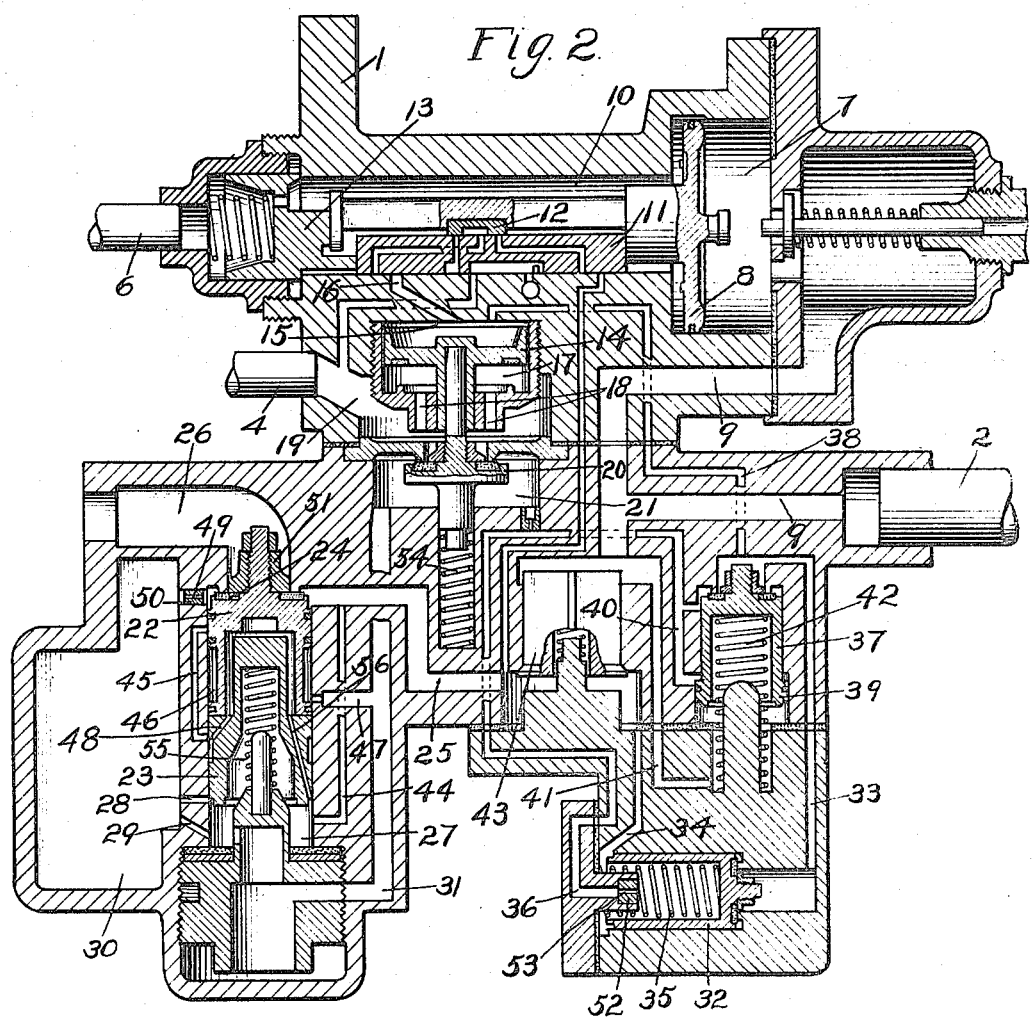
Figure 1:
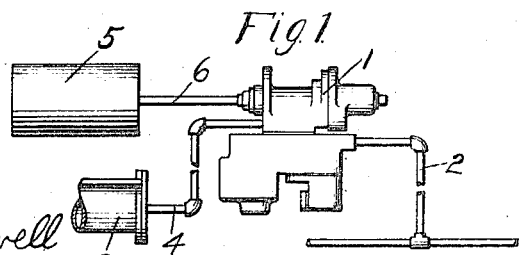
Figure 5:
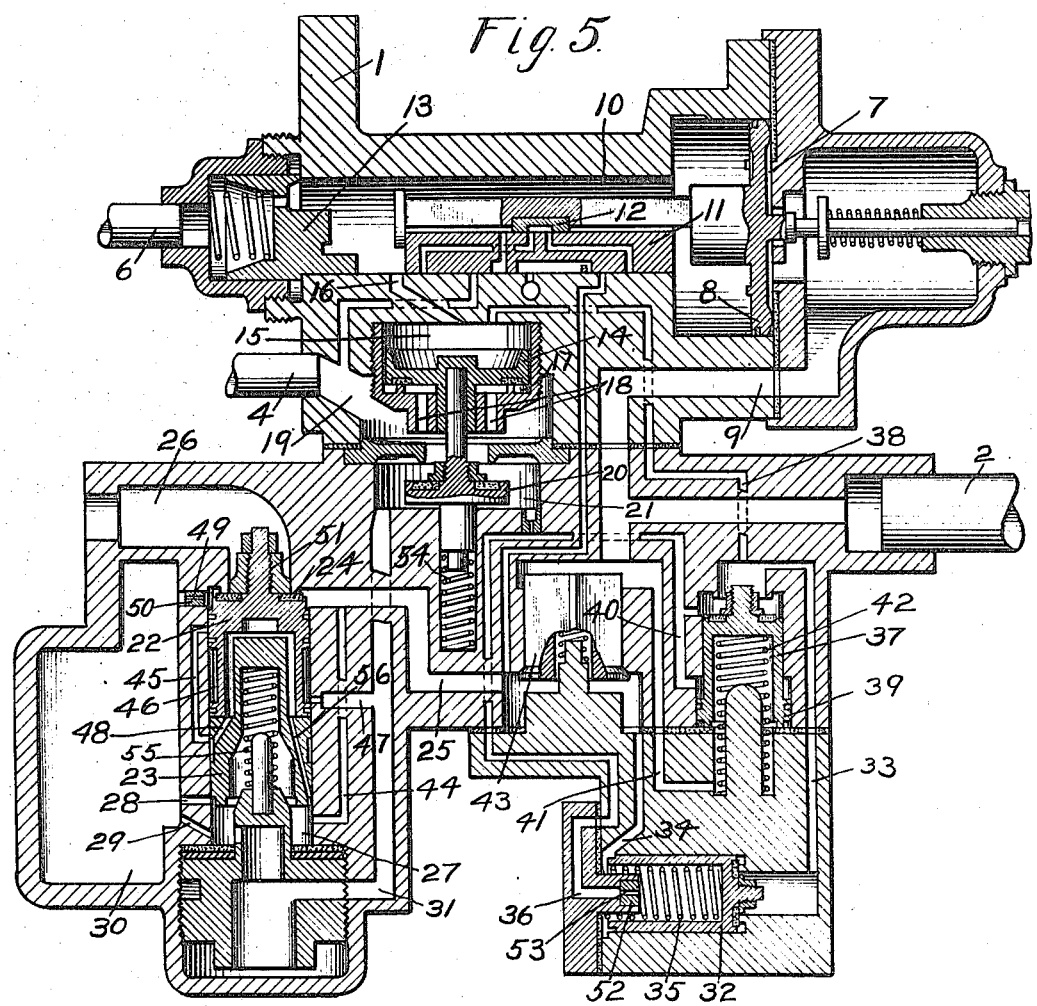

In the accompanying drawings; Figure 1 is a diagrammatic view of a car air brake equipment including my improved brake controlling valve device; Fig. 2 a central sectional view of the brake controlling valve device embodying my improvements, showing the parts in normal release position; Fig. 3 a similar view, showing the parts in emergency application position after the brake pipe pressure has been reduced to a predetermined degree; Fig. 4 a sectional view of the brake pipe vent valve mechanism in the position cutting off flow to the atmosphere and the brake cylinder; and Fig. 5 a view similar to Fig. 3, showing the auxiliary reservoir supply valve in open position.

My improvements are shown in the drawings as applied to a triple valve device of the so-called retarded release type, although it will be understood that the invention may be employed with various other types of triple valves.

As shown diagrammatically in Fig. 1 of the drawings, the triple valve device 1 has connection with the usual brake pipe 2, brake cylinder 3 by way of pipe 4, and auxiliary reservoir 5 through pipe 6.

The triple valve device may comprise a casing having piston chamber 7 containing triple valve piston 8 and connected by passage 9 with brake pipe 2. Valve chamber 10 on the opposite side of piston 8 is open to the auxiliary reservoir 5 and contains the main slide valve 11 and auxiliary slide valve 12 adapted to be operated by piston 8.

The triple valve shown, being of the retarded release type, has a yielding stop device 13 tending to hold the parts in full release position and adapted to permit movement of the triple valve to the inner retarded position under a sufficiently rapid rate of increase in brake pipe pressure.

The triple valve casing also contains a quick action valve mechanism comprising a piston 14 having chamber 15 at one side open to a port 16 leading to the main slide valve seat and having chamber 17 at the opposite side open through ports 18 to brake cylinder passage 19 when the piston 14 is in its normal position, the piston being adapted in emergency position to seat and cut off communication from chamber 17 to the brake cylinder. A valve 20 is adapted to be actuated by the piston 14 for opening communication from chamber 21 to brake cylinder passage 19.

According to my invention, the venting of fluid from the brake pipe in an emergency application of the brakes is secured through the operation of a separate valve mechanism controlled by the quick action valve and comprising two movable pistons 22 and 23.

The piston 22 carries a valve 24 for controlling communication from the main brake pipe vent passage 25 to atmospheric exhaust port 26 and the other piston 23, operating in the same piston chamber, has chamber 27 at one side normally connected by passages 28 and 29 with a chamber 30, the chamber 27 being also connected by a passage 31 with chamber 21.

The vent valve mechanism above described also controls the preliminary venting of fluid from the brake pipe to the brake cylinder, the flow from the brake pipe to the brake cylinder being augmented, however, under certain conditions, by the operation of a valve piston 32 which is subject on one side to auxiliary reservoir pressure supplied through a passage 33 and on the opposite side to brake pipe pressure supplied through passage 34 and to the pressure of a spring 35. When the valve piston 32 is seated in one direction against auxiliary reservoir pressure, communication is open from the brake pipe passage 34, through a passage 36 to chamber 21 which in turn is open to the brake cylinder when the valve 20 is in open position. In the opposite seating position said communication is closed.

According to my invention, fluid is not supplied from the auxiliary reservoir to the brake cylinder in the ordinary way in the emergency position of the triple valve device, but is controlled by a separate valve piston 37 which has one side connected by a passage 38 with chamber 15. The outer end 39 of the valve piston 37 is of greater area than the main portion and the differential area thus formed as well as the area of the inner end which is exposed when the valve piston is at its inner seat are adapted to be exposed to brake cylinder pressure supplied through passage 40 from chamber 21. The outer face of the valve piston is subjected to brake pipe pressure supplied through passage 41 and the pressure of a light spring 42. It will thus be seen that the operation of the valve piston 37 depends upon the degree of brake cylinder pressure attained as well as the amount of reduction which is made in brake pipe pressure.

In operation, to effect an emergency application of the brakes, a sudden reduction in brake pipe pressure is made and thereby the triple valve on the head car, or on the car nearest the point where the sudden brake pipe reduction is initiated, is shifted to emergency position, as shown in Fig. 3. Fluid from the auxiliary reservoir is then supplied through passage 16 to quick action piston chamber 15 and the piston 14 is thereupon quickly shifted to its outer seating position, opening the valve 20 and cutting off communication from the chamber 17 to the brake cylinder.

Fluid is thus vented from chamber 27 through passage 31 and an immediate discharge of fluid from the brake pipe to the brake cylinder takes place from passage 9 past check valve 43, through passage 25, and passage 44, which opens into chamber 27. The reduction in fluid pressure thus produced in chamber 27 causes the movement of the vent valve pistons 22 and 23 to their outer positions, seating the piston 23.

Fluid is now vented from the brake pipe passage 25 to the exhaust port 26, so that a rapid reduction in brake pipe pressure is effected which is communicated to the next succeeding triple valve to cause the prompt movement thereof to emergency position, and so on throughout the train. It will thus be seen that quick action is propagated through the train in much the same manner as formerly.

With the vent valve pistons in open position, fluid continues to flow from the brake pipe to the brake cylinder from passage 25 through a passage 45, annular recess 46 in piston 22, and passage 47, to passage 31.

Fluid supplied from the brake pipe to the brake cylinder by the operation of the vent valve mechanism is sufficient to insure the movement of the brake cylinder piston to effect the application of the brake shoes to the wheels with a light pressure in the brake cylinder, say from five to seven pounds, and this takes place serially throughout the train as quickly as the quick serial feature can act.

The pressure in chamber 30, which is normally charged from the brake pipe with fluid under pressure, also reduces with the pressure in chamber 27 through passages 28 and 29 and this has a purpose in connection with the closing of the vent valve mechanism. In the open position of said mechanism, as shown in Fig. 4, it will be noted that passage 28 communicates with the space between pistons 22 and 23, through a port 48 in piston 23, so that the outer face of the piston 22 is now subject to the pressure in said chamber.

The passages 28 and 29 being cut off in the open position of the vent valve mechanism, the only means left for raising the pressure in chamber 30 is through a restricted port 49 of a choke plug 50.

The pressure in chamber 30 having dropped to a certain degree, say down to thirty five or forty pounds, and the brake pipe pressure in passage 25 being considerably higher, the piston 22 is held in open position by the higher pressure until by flow through the restricted port 49, the pressure in chamber 30 and below the piston 22 has become more nearly equal to the pressure in passage 25. The piston 22 then moves upwardly, assisted by the reduced pressure acting over the area of the piston adjacent to the port 26. It will be noted that the piston has a projecting portion 51 which as it enters the port 26 gradually restricts the flow from passage 25 out through passage 26 and this tends to make the pressure acting on this area more nearly atmospheric pressure, until near the seating point, a portion of the projection 51, so nearly fits the port opening of passage 26, that the exposed area of the piston is practically subject to atmospheric pressure at this time. At the same time, the venting of fluid from passage 25 is nearly cut off and consequently the pressure in passage 25 tends to build up. The influence of any such increase in pressure on the area of piston 22 which is still exposed to the pressure in passage 25 is, however, compensated for, by permitting a more rapid equalization of pressures on opposite sides of the piston 22 through passage 45, which is adapted to connect the space above the piston with the space below the piston 22 as the piston moves toward its upper seat. The pressure below the piston being substantially equalized with the pressure in passage 25, it will be seen that the nearly atmospheric pressure acting on the area within the passage 26 permits a considerable unbalanced pressure to act on a corresponding area in the chamber below the piston, so that the same is promptly and positively moved to its seat and since only a limited area in the seated position is directly exposed to brake pipe pressure in passage 25, there will be no liability of the valve opening and closing through possible surging of brake pipe pressure when the valve is closed.

The piston 23 will remain seated in its lower position until substantial equalization, since the brake cylinder pressure acting below the piston acts only on a somewhat reduced area, while substantially brake pipe pressure acts above the piston.

While in the operation of opening and closing the vent valve piston 22, there are a number of steps or stages of action, the whole operation takes places in a very short time, say two or three seconds.

It will also be noted that when the piston 22 has moved to closed position, further flow of fluid from the brake pipe to the brake cylinder is cut off so far as the vent valve mechanism is concerned.

Referring now to the action of the valve piston 32, the spring 35 is adjusted so as to hold the piston in its normal open position until the brake pipe pressure has been reduced to a considerable degree, say to thirty five pounds, and it will be evident that such a reduction will take place on the head cars very shortly after the initial reduction has been made.

While the pistoin 32 is in its outer seated position, communication is open from the brake pipe through passage 34 and passage 36 to the brake cylinder, so that a slight flow of fluid will perhaps take place even on the head cars. As soon as the brake pipe pressure drops to thirty five pounds or the pressure at which the valve piston 32 operates, the auxiliary reservoir pressure acting on the opposite side lifts the same from its outer seat, and as the full area is now exposed, the valve piston is quickly shifted to its inner seat, closing the brake cylinder connection. A choke plug 52 having a restricted port 53 limits the flow from the chamber at the back of the valve piston 32 to the brake cylinder passage 36, so that this flow does not exert any substantial influence on the action of the valve piston.

On the extreme head cars, it will now be seen that since the brake pipe pressure very quickly reduces to the necessary degree to effect the closure of the valve piston, there will then be no flow of fluid from any source to the brake cylinder, the vent valve mechanism having previously cut off brake pipe supply to the brake cylinder at that place.

It will be evident that the valve piston 32 on the head car closes first, then the next car and so on, thus allowing the same to remain open longer and longer so that there is a gradual flow of fluid from the brake pipe to the brake cylinder which continues from a very short time on the head car to a much longer time on the rear cars.

This action would be propagated throughout the train in the manner described but for the effect of another valve piston 37 which primarily controlling the admission of fluid from the auxiliary reservoir to the brake cylinder also controls the operation to a certain extent of the valve piston 32.

This valve piston 37 is acted upon by brake cylinder pressure and brake pipe pressure so that an increasing brake cylinder pressure works with a reducing brake pipe pressure to open the valve piston.

On the head cars then, the brake pipe pressure must reduce to a low point before the valve piston will shift, since on these cars the brake cylinder pressure remains either stationary where the brake pipe is entirely cut off or is rising very slowly where fluid is still being admitted to the brake cylinder by the operation of the valve piston 32.

It will thus be seen that on the cars at the head of the train, the brake cylinder pressure is so low that it exerts only a slight influence on the operation of the valve piston 37 and it is only when the brake pipe pressure has been reduced to a low point, say twenty pounds, that the same is actuated. The movement of the valve piston 37 from its seat, exposes the full area to auxiliary reservoir pressure and this causes the quick movement thereof to the full open position, in which communication is opened from the auxiliary reservoir passage 38 to brake cylinder passage 40, so that fluid is now supplied from the auxiliary reservoir to the brake cylinder.

A little further back in the train, say the fifth car, for example, the brake cylinder pressure rises higher than on the head car, due to the valve piston 32 remaining open longer and consequently, it requires a less reduction in brake pipe pressure to effect the movement of the valve piston 37, perhaps to twenty five pounds, as compared with twenty on the head car.

Similarly, on succeeding cars to the rear, the valve piston 37 is subjected to a progressively increasing brake cylinder pressure, which permits of the movement of same with a still lighter reduction in brake pipe pressure. A car is finally reached, say about the fortieth car, where the valve piston 37 shifts before the valve piston 32 is shifted and in this case, the valve piston 32 remains in the position for supplying fluid from the brake pipe to the brake cylinder, since the opening of the valve piston 37 operates to reduce the pressure supplied through passage 33 to the inner face of the valve piston 32 to substantially brake cylinder pressure.

When the auxiliary reservoir has been reduced by flow to the brake cylinder to a degree somewhat higher than the brake cylinder pressure, dependent upon the spring 54, say five pounds higher, the piston 14 moves upwardly so as to close the valve 20. The piston 14 being a loose fit, permits the final equalization of pressure between the auxiliary reservoir and the brake cylinder, since the lifting of the piston from its seat reëstablishes communication from the auxiliary reservoir to the brake cylinder through the ports 18.

Upon equalization, the valve piston 37 is moved to its upper seat by the spring 42 and the vent valve piston 23 is also returned to its upper position by the spring 55. A port 56 may be provided in the piston 23 to afford communication from the space between the pistons 22 and 23 to the chamber 27 so as to insure that the pressures on opposite sides of the piston 23 will remain balanced.

Another feature of my invention consists in employing a single port through which fluid is vented from the brake pipe to the brake cylinder in a service application of the brakes, and through which fluid from the auxiliary reservoir is supplied to effect the movement of the quick action piston to emergency position.

For this purpose, the quick action piston 14 fits loosely in the piston chamber, so that when fluid is vented from the brake pipe through the usual quick service ports controlled by the tripple valve parts in a service application of the brakes, a flow is established from the passage 16, around the piston 14, and through ports 18 to the brake cylinder.

In an emergency application, fluid from the auxiliary reservoir is supplied through the same passage 16 to the piston 14 and this operates to shift the piston 14 to emergency position, in which the same seats, and thereby prevents flow from the auxiliary reservoir to the brake cylinder.

It will now be seen that according to my invention, quick serial action is propagated through the train in the usual manner, and at the same time a preliminary charge of fluid from the brake pipe to the brake cylinder is effected which is sufficient to insure the movement of the brake cylinder piston to application position. Then the brake cylinder pressure is gradually built up from the brake pipe through a restricted port which is shut off when the brake pipe pressure reduces to a predetermined degree. Such reduction naturally occurs at the head end of the train first, so that flow of fluid from the brake pipe to the brake cylinder is cut off almost immediately at the head end, while the closing is delayed longer and longer on each succeeding car toward the rear of the train.

This retards the building up of brake cylinder pressure at the head end of the train until brake cylinder pressure has been obtained on cars at the rear. Finally, after sufficient brake cylinder pressure has been obtained on the rear cars to prevent dangerous running in of the slack, fluid is rapidly admitted from the auxiliary reservoir to the brake cylinder to obtain the desired emergency pressure.

As the admission of fluid from the auxiliary reservoir to the brake cylinder depends upon the rise in brake cylinder pressure as well as the reduction in brake pipe pressure, it will be evident that the earlier reduction in brake pipe pressure at the head end will be compensated for by the more rapid rise in brake cylinder pressure toward the rear, so that a more nearly simultaneous rise in brake cylinder pressure throughout the train is secured.

Having now described my invention, what I claim as new and desire to secure by Letters Patent, is:

1. In a fluid pressure brake, the combination with a brake pipe and brake cylinder, of a valve device, means operated upon a sudden reduction in brake pipe pressure for venting fluid from one side of said valve device to operate same and open a restricted port for venting fluid from the brake pipe to the brake cylinder, and means operated upon a sudden reduction in brake pipe pressure for connecting the vented side of said valve device to a chamber having a restricted port communicating with the brake pipe.

2. In a fluid pressure brake, the combination with a brake pipe and brake cylinder, of a valve device normally subject on one side to fluid pressure and the pressure of a spring and operated by reducing the fluid pressure on the spring side of said device upon a sudden reduction in brake pipe pressure for supplying fluid to the brake cylinder and means adapted upon a predetermined reduction in brake pipe pressure to a degree substantially higher than the equalizing pressure for closing a communication through which fluid is supplied to the brake cylinder.

3. In a fluid pressure brake, the combination with a brake pipe and brake cylinder, of a valve device operated upon a reduction in brake pipe pressure for supplying fluid to the brake cylinder and a vent valve mechanism operated upon a sudden reduction in brake pipe pressure for venting fluid from the brake pipe simultaneously to the brake cylinder and to the atmosphere and means for closing said valve mechanism at a predetermined reduction in brake pipe pressure to a degree substantially higher than the brake cylinder pressure.

4. In a fluid pressure brake, the combination with a brake pipe and brake cylinder, of a valve device operated upon a reduction in brake pipe pressure for supplying fluid to the brake cylinder and a vent valve mechanism adapted upon a sudden reduction in brake pipe pressure to first supply fluid from the brake pipe to the brake cylinder, then operating to open communication for venting fluid from the brake pipe to the atmosphere and to the brake cylinder and adapted to close at a predetermined reduction in brake pipe pressure.

5. In a fluid pressure brake, the combination with a brake pipe and brake cylinder, of a vent valve mechanism operating upon a sudden reduction in brake pipe pressure for venting fluid from the brake pipe to the brake cylinder through large ports and adapted to close at a predetermined reduction in brake pipe pressure, and a valve device for supplying fluid from the brake pipe to the brake cylinder through a restricted port and adapted to close upon a further reduction in brake pipe pressure.

6. In a fluid pressure brake, the combination with a brake pipe and brake cylinder, of a vent valve mechanism operating upon a sudden reduction in brake pipe pressure for venting fluid from the brake pipe to the atmosphere and through a large port to the brake cylinder and adapted to close at a predetermined reduction in brake pipe pressure and a valve device for also supplying fluid from the brake pipe to the brake cylinder through a restricted port and adapted to close upon a further reduction in brake pipe pressure.

7. In a fluid pressure brake, the combination with a source of fluid under pressure, a brake cylinder, and a brake pipe, of means for supplying fluid to the brake cylinder at a rate corresponding with the rate of reduction in brake pipe pressure and a valve device operated according to the increase in brake cylinder pressure and the reduction in brake pipe pressure for supplying fluid from said source to the brake cylinder.

8. In a fluid pressure brake, the combination with a source of fluid under pressure, a brake cylinder, and a brake pipe, of means for supplying fluid to the brake cylinder at a rate corresponding with the rate of reduction in brake pipe pressure and a valve device subject to the opposing pressures of the brake pipe and the brake cylinder and operating when the brake cylinder pressure exerts the balance of power for supplying fluid from the source of pressure to the brake cylinder.

9. In a fluid pressure brake, the combination with a source of fluid under pressure, a brake pipe, and a brake cylinder, of means for controlling the admission of fluid to the brake cylinder in an emergency application, comprising a vent valve mechanism for venting fluid from the brake pipe to the atmosphere and to the brake cylinder and adapted to close at a predetermined reduction in brake pipe pressure, a valve device for supplying fluid from the brake pipe to the brake cylinder through a restricted port and adapted to close at a further predetermined reduction in brake pipe pressure, and another valve device adapted to supply fluid from the source of pressure to the brake cylinder and operative according to the reduction in brake pipe pressure and the increase in brake cylinder pressure.

10. In a fluid pressure brake, the combination with a brake pipe, brake cylinder, and triple valve device, of a vent valve mechanism for venting fluid from the brake pipe to the atmosphere and to the brake cylinder, a valve device for supplying fluid from the brake pipe to the brake cylinder through a restricted port and a piston and valve operated by said triple valve device upon a sudden reduction in brake pipe pressure for effecting the operation of the vent valve mechanism and for opening communication through which said valve device vents fluid from the brake pipe to the brake cylinder.

11. In a fluid pressure brake, the combination with a brake pipe, of a vent valve mechanism comprising a valve piston subject on one side to the pressure of fluid flowing from the brake pipe to the brake pipe vent port, a seating piston operated by venting fluid from one side, and a chamber having a restricted communication with the brake pipe, the pressure in which is adapted to reduce with that on the seating piston, fluid from said chamber being adapted to equalize into the space between the valve piston and the seating piston in the open position of said valve mechanism.

12. In a fluid pressure brake, the combination with a brake pipe, of a vent valve mechanism having a vent valve portion adapted to gradually choke the brake pipe vent port in the act of closing to thereby substantially reduce the pressure acting thereon and thus effect the prompt closing of said vent valve.

13. In a fluid pressure brake, the combination with a brake pipe, of a vent valve mechanism having a vent valve portion and means for permitting equalization of fluid pressures on the opposite sides thereof in the act of closing.

14. In a fluid pressure brake, the combination with a brake pipe, of a vent valve mechanism having a vent valve portion and means for supplying fluid flowing from the brake pipe to the brake pipe vent port at one side of said portion to the opposite side during the closing movement thereof.

15. In a fluid pressure brake, the combination with a brake pipe, of a vent valve mechanism comprising a valve piston subject on one side to the flow of fluid from the brake pipe to the brake pipe vent port and to the pressure of fluid in said port and a seating piston operated by venting fluid from one side for effecting the opening of said valve piston, and means for supplying fluid from the vent valve side of the valve piston to the opposite side.

16. In a fluid pressure brake, the combination with a brake pipe, of a vent valve mechanism comprising a valve piston subject on one side to the flow of fluid from the brake pipe to the brake pipe vent port and to the pressure of fluid in said port and a seating piston operated by venting fluid from one side for effecting the opening of said valve piston, means for supplying fluid from the vent valve side of the valve piston to the opposite side and means for choking the brake pipe vent port in the closing movement of the valve piston.

17. In a fluid pressure brake, the combination with a brake pipe, brake cylinder, and source of fluid under pressure, of a valve device for controlling the supply of fluid to the brake cylinder in an emergency application of the brakes having means for first effecting a predetermined reduction in brake pipe pressure and quickly admitting a charge of fluid from the brake pipe to the brake cylinder, means for supplying fluid from the brake pipe to the brake cylinder through a restricted port until the brake pipe pressure has reduced to a predetermined degree, and means dependent upon the increase in brake cylinder pressure and the reduction in brake pipe pressure for supplying fluid from said source to the brake cylinder.

18. In a fluid pressure brake, the combination with a brake cylinder, auxiliary reservoir, and brake pipe, of a triple valve device having a quick action piston providing communication through which fluid is vented from the brake pipe to the brake cylinder in a service application of the brakes and operated by fluid from the auxiliary reservoir in an emergency application of the brakes for closing said communication.

19. In a fluid pressure brake, the combination with a brake cylinder, auxiliary reservoir, and brake pipe, of a triple valve device having a quick action piston providing communication for venting fluid from the brake pipe to the brake cylinder in a service application of the brakes and a port for admitting fluid from the brake pipe to said piston in a service application and from the auxiliary reservoir in an emergency application of the brakes.

20. In a fluid pressure brake, the combination with a brake cylinder, auxiliary reservoir, and brake pipe, of a triple valve device having a quick action piston providing communication for venting fluid from the brake pipe to the brake cylinder in a service application of the brakes and a port for admitting fluid from the brake pipe to said piston in a service application and from the auxiliary reservoir in an emergency application of the brakes, the movement of the quick action piston to emergency position being adapted to close said communication to thereby prevent flow of fluid from the auxiliary reservoir to the brake cylinder.

In testimony whereof I have hereunto set my hand.

WALTER V. TURNER.

Witnesses:
A. M. CLEMENTS,
BARBARA HERBERT.